Nov. 2, 1971 W. R. BOYLE 3,616,639
PULSE GENERATOR
Filed Oct. 24, 1968
2 Sheets-Sheet 1
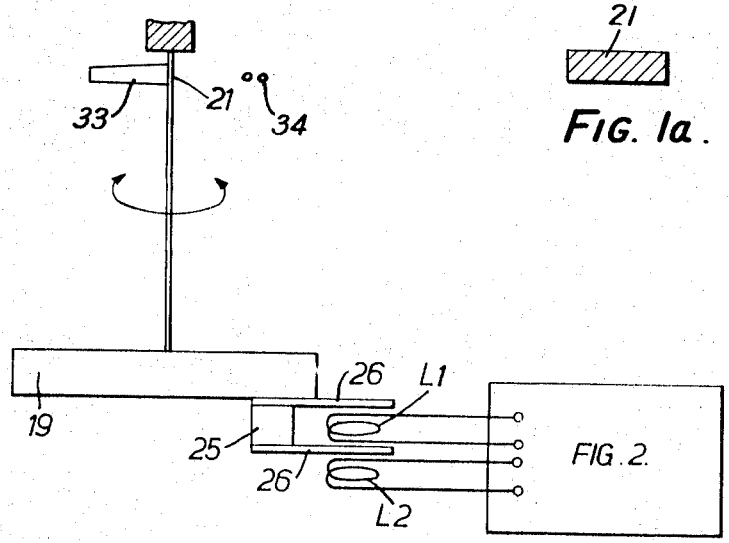
FIG. 1a.
FIG. 1.
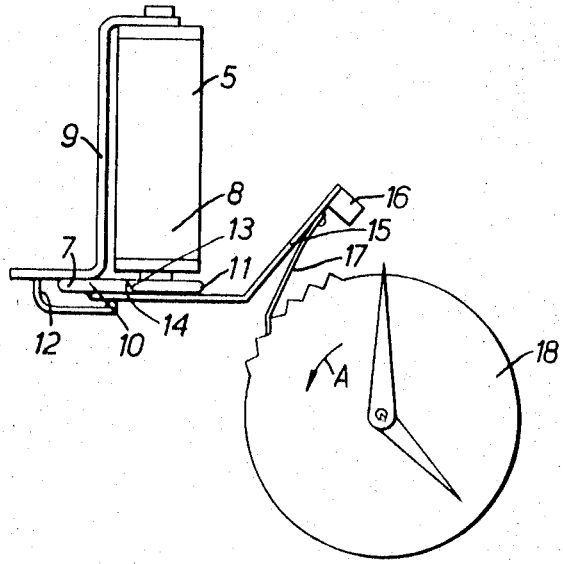
FIG. 2.
INVENTOR
William R Boyle

United States Patent Office 3,616,639
Patented Nov. 2, 1971

3,616,639
PULSE GENERATOR
William R. Boyle, Wimborne, England, assignor to The Glacier Metal Company Limited, Alperton, Wembley, Middlesex, England
Filed Oct. 24, 1968, Ser. No. 770,244
Claims priority, application Great Britain, Oct. 26, 1967, 48,782/67; July 1, 1968, 31,289/68
Int. Cl. G04c *3/04*
U.S. Cl. 58—28    11 Claims

ABSTRACT OF THE DISCLOSURE

This invention is a method of accurately timing control pulses for a clock mechanism using a pendulum. The nearest prior art known is an extract from a book "Horlodges a Balancier Pendulaire" pages 67 and 68, a copy of which is attached.

---

The present invention is distinguished from this by virtue of the use of a torsional balance or pendulum which preferably has means for picking up the generated pulses inductively or by some other method that does not require physical contact with the oscillating parts.

This invention relates to a generator of pulses at a regular frequency, for example for driving a clock.

The invention is applicable to electric clocks of the kind that are powered by small electric batteries and, in particular, to domestic clocks such as are used on the mantle-piece or as wall mounted clocks, or to factory master and slave clocks. This type of clock is not subjected to vibration or undue amount of movement such as would be encountered in "travelling" clocks or clocks mounted in vehicles.

According to the present invention a torsion balance or pendulum determines the frequency of generation.

Thus oscillation of such a balance may be arranged to trigger an electric circuit at certain points in an oscillation, and the circuit can operate to maintain the balance in oscillation and to supply energy for driving a clock.

Electrical pulses may be connected directly to impulsing equipment for indexing a clock and the balance or pendulum could also control a number of repeater clocks. Thus a repeater clock could have its own battery and clock driving means while it only receives from the balance or pendulum switching signals at a regular frequency to control the operation of the clock.

According to a feature of the present invention a clock mechanism includes an oscillatory member and means in proximity to, but spaced from, the path of oscillation of the member for deriving clock pulses from oscillations of the member.

The present invention does not need to have any moving electrical contacts and in the preferred form the proximity means for deriving clock pulses is electromagnetic consisting of a stationary coil close to the path of movement of a permanent magnet carried by the oscillatory member. It would also be possible to derive pulses capacitatively.

The proximity means preferably also derives pulses for maintaining oscillations of the member for example by energising a coil to create a magnetic field which reacts with the field of the permanent magnet, to give an impulse to the oscillatory member twice per complete oscillation.

An aspect of the present invention is an electrical circuit having an input from the proximity means and an output for driving the clock mechanism, for example by energising a solenoid at intervals determined by the natural frequency of the oscillatory member, each pulse being arranged to index the clock mechanism through one step.

A feature of the circuit is a very high gain negative feed back loop which tends to maintain the circuit in a state bordering on operation in response to receipt of a driving pulse from the proximity means. For example the circuit may include transistors or the equivalent arranged normally to be just on the edge of conducting so that response will occur to a relatively small input pulse.

This type of circuit—which can be designed with no moving parts—can be maintained automatically biased as desired in spite of variations in the voltage of a battery supply, variations in temperature, and variations in the circuit component values.

An impulsing solenoid for a clock hand driving mechanism may comprise a solenoid coil, a stator, and an armature, the armature being located on the stator by a thin leaf spring such that gravity is the major force opposed to the magnetic pull. The operation of the impulsing solenoid is substantially without friction. The gap between the armature and the stator is preferably inclined or angled with respect to the longitudinal axis of the solenoid thereby providing a gap which gives minimum change of magnetic force in relation to movement of the armature towards the stator. The armature preferably has a rolling action on the stator. Conveniently the armature carries a counter-weight arm or an arm which acts as its own counter-weight at the end of which is carried a resilient pawl mechanism to operate the gear train for the hour and minute hands of the clocks.

In one form of the invention the torsion balance or pendulum is suspended by an elongated member whose cross-section is a rectangle of which one side is much greater than the other.

The torsion balance can be driven by electromagnetic means included in the electric circuit, and may carry a permanent magnet arm system which cooperates with a stationary flat and thin operating coil which passes between the arms on the balance once every half cycle of rotation of the balance.

Preferably the balance is driven by the magnetic repulsion effect.

The invention may be carried into practice in various ways and one embodiment will now be described by way of example with reference to the accompanying drawings, of which:

FIG. 1 is a diagram of a chronometer torsion balance or pendulum for determining the frequency of indexing pulses to be supplied to hand indexing mechanism and its physical relationship to electric coils;

FIG. 1a is a view drawn to larger scale illustrating the cross-sectional configuration of the suspension member for the torsion pendulum;

FIG. 2 is a diagram showing the hand-indexing mechanism; and

Figure 3:
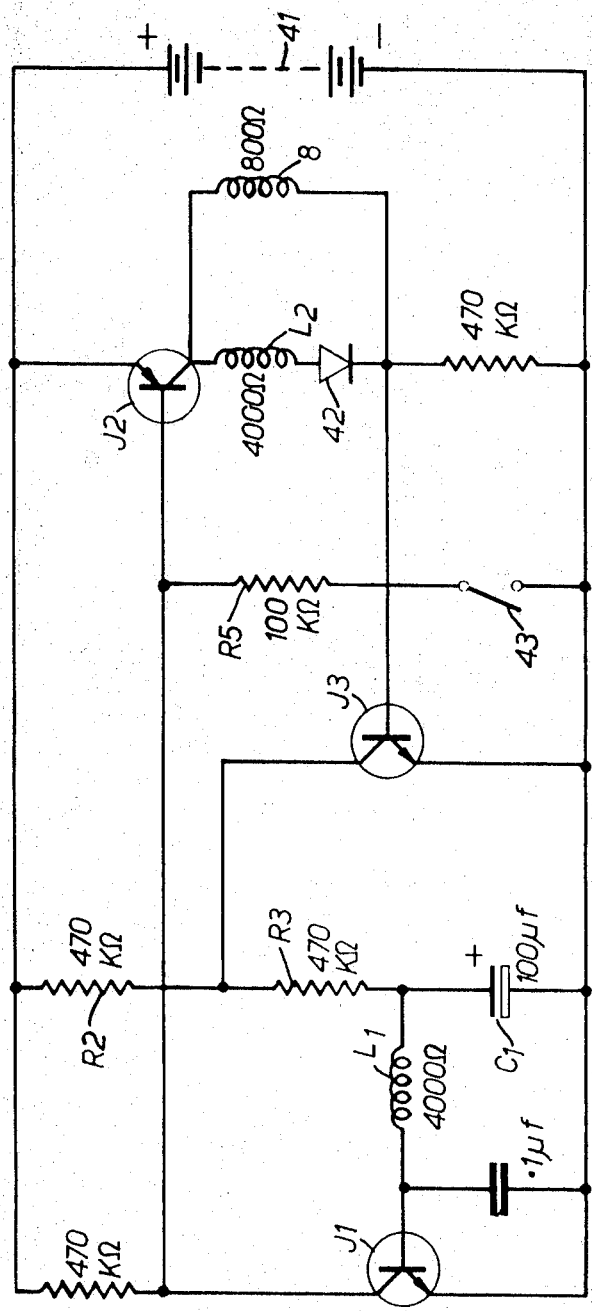
FIG. 3 is a circuit diagram showing how the coils are connected in circuit with a solenoid coil for operating the indexing mechanism.

The hand indexing mechanism operates by the supply of indexing pulses at a predetermined frequency to a solenoid 5 to step the hands of the clock at this frequency.

FREQUENCY CONTROL (FIG. 1)

The frequency is determined by oscillations of a torsional pendulum constituted by a generally flat suspension strip 21 having a flat disc weight 19 centrally suspended from it to make torsional oscillations about the axis of the strip. This suspension strip 21 is an elongated member having a rectangular cross-section and wherein one side of the rectangle is much greater than the other. The elongated rectangular cross-sectional configuration of the suspension member 21 is shown in FIG. 1a. The weight 19 carries a permanent magnet 25 and at the mid point of an oscillation the magnet 25 is at the common axis of two flat coils L1 and L2. Coil L1 is positioned so that the two arms 26 of the permanent magnet pass above and below it, thus subjecting coil L1 to a strong magnetic field. Coil L2 is for giving impulses to the balance and is positioned outside the magnet arms 26, and is therefore subjected to the stray field from one arm of the permanent magnet, which has been found to be sufficient as the balance impulse coil only needs to cooperate with a weak magnetic field. The sensing coil L1 generates a triggering pulse as the magnet arms pass it, which pulse is used to trigger the circuit shown in FIG. 3 at the precisely determined frequency of the pendulum and in consequence of each triggering pulse a precisely timed pulse is generated in the hand index solenoid 5 for indexing the clock hands and a pulse is also generated in the coil L2 which produces a magnetic field arranged to provide a force tending to maintain the pendulum in oscillation by magnetic interaction between the balance impulse coil L2 and the permanent magnet 25.

In this way the pendulum is kept in oscillation, and it will be seen that there are no movable electric contacts which might stick, or chatter, or wear and affect operation after a period of use.

In a preferred arrangement the torsion balance suspension strip 21 is gripped at each end by clamps (not shown) which nip the strip at either side with line contact so that the effective length of the strip is accurately determined, and does not vary in use. Preferably the upper clamp is hinged to allow rotation round an axis at right angles to the plane of the strip, thus avoiding undesirable stresses in the suspension strip in the event of mis-alignment of the supporting means.

CLOCK HAND-INDEXING (FIG. 2)

The clock hand operating solenoid 5 is shown in more detail in FIG. 2 and comprises a solenoid coil 8, a stator 9, an armature 10 and a pole piece 11. The armature 10 is located in relation to the stator 9 by being welded to an arm 15 which can pivot on a fulcrum on a very thin steel leaf 12 with substantially no spring or preset force. The armature 10 has a curved rear portion 7 which has a rolling action with respect to the stator 9. The armature 10 is constructed so as to have an inclined gap face 13 parallel with a pole face 14. The angled, parallel, gap gives a small change of force in relation to movement. The leaf 12 is thin enough to avoid significant effect on the rate of the system and leaves gravity as the major force opposed to magnetic pull on the armature 10 from the solenoid coil 8. This avoids accurate setting of the leaf which serves only to locate the armature 10. The armature 10 carries an arm 15 at the end of which is a counterweight 16. A leaf spring pawl 17 is attached to the armature arm 15 to engage in the teeth of a clock indexing mechanism shown generally at 18.

THE ELECTRICAL CIRCUIT (FIG. 3)

The sensing coil L1 is connected to the base of a transistor J1 whose collector is connected to the base of a transistor J2 which has the solenoid coil 8 and the balance impulse coil L2 connected in parallel in its collector circuit, while the collector/emitter path of the transistor J2 and the coil load, and the base/emitter path of J3, are connected in series across the battery 41. The coil L2 is in fact connected in series with a semiconductor rectifier 42 so that when the solenoid drops out after the coil 8 has ceased to be energised and the hands have been indexed, the back voltage generated does not energise the impulse coil L2. Transistor J3 whose collector is connected to the junction of two resistors R2 and R3 forming a potential divider setting the bias on the base of the transistor J1, completes a negative feedback path of very high gain which returns the circuit to its equilibrium condition as soon as the effect of a trigger pulse in the sensing coil L1 has been experienced by the coil 8. This negative feed-back loop automatically maintains an equilibrium state in the absence of a pulse in the sensing coil L1, in which equilibrium state the transistors J1, J2 and J3 are all held just at the edge of conduction. This condition is not significantly affected by considerable changes in battery voltage, ambient temperature, or circuit component values. The gains of the three transistors may each be of the order of 100.

In order that a triggering pulse does not upset the setting of the circuit, the resistor R3 in the potential divider setting the bias on the base of the transistor J1 is connected in series with a large capacitor C1 to give the negative feed-back loop a large time constant of about 47 seconds. As this is much larger than the ON time of the circuit when driving the clock the bias voltage does not change appreciably when a triggering pulse switches it on.

With a typical cycle of:

ON for 0.2 second, OFF for 4.8 seconds, ON for 0.2 second . . . etc., the capacitor C1 has plenty of time to be re-charged during the OFF period.

The circuit has the advantage that it does not need setting-up adjustment, and the biasing of the transistors is automatically set by the feed-back loop independently of variations in the battery voltage and independently of temperature. In fact the bias does not depend on the characteristics of the transistors or on the values of the resistors.

An advance and retard switch 43 works as follows:

When the switch is closed, the base of J2 is connected via R5 to battery negative. This makes J2 conductive, and so a current passes through the hand indexing coil 8. When the switch is released, the solenoid armature drops open, and the clock hands are indexed forward 5 seconds. This is repeated as often as necessary. If the switch is held closed the solenoid armature remains closed, and therefore inoperative, so the clock loses 5 seconds per half cycle of the balance.

Although it is preferred that pulses are derived without physical contact with oscillating parts, e.g. by means of the coil L1, it is possible to switch contacts physically during oscillations and so to avoid having the coil L1.

Thus the strip 21 could carry a laterally stiff contact arm 33 extending perpendicular to the width and length of the strip and a distance about one-hundredth of the strip from the suspension anchorage. This arm would during oscillations open and close a pair of stationary electrical contacts 34 on either side of the strip to trigger the circuit. A steel strip 0.0065″ thick and 0.025″ wide and 4″ long would be suitable for this arrangement, with a contact arm 0.5″ long positioned 0.04″ from the anchorage.

What I claim as my invention and desire to secure by Letters patent is:

1. A timer including an electrical circuit having an output for pulses, a torsion balance comprising an elongated and vertically arranged torsion member having a rectangular cross-section and wherein one side of the rectangle is much greater than the other, means suspending said torsion member from its upper end and a weight carried by the lower end thereof for effecting oscillations of said torsion member about its axis, and means for triggering said electrical circuit in response to oscillations of said weight.

2. A timer as claimed in claim 1, including a clock mechanism and means for operating the clock mechanism in response to the output from the circuit.

3. A timer as claimed in claim 1 including means for giving the balance driving impulses by coupling from the circuit output.

4. A timer as claimed in claim 3 in which the weight is in the form of a cylinder arranged to turn about its polar axis, and including means for applying the driving impulses to the cylinder as tangentially-directed forces.

5. A timer as claimed in claim 4 including a magnet mounted on the periphery of the cylinder, and a balance driving impulse coil close to which coil the magnet passes in each half-oscillation.

6. A timer as claimed in claim 4 including a magnet mounted on the periphery of the cylinder, and a pulse generating coil, close to which coil the magnet passes in each half-oscillation.

7. A timer as claimed in claim 1 in which the circuit includes a negative feed back loop for tending to maintain the circuit in a state bordering on operation in response to receipt of a triggering signal.

8. A generator as claimed in claim 1 in which the means for triggering the circuit are out of physical contact with the oscillating parts of the balance.

9. A timer including an electric circuit having an output for pulses, a torsion balance comprising a weight in the form of a cylinder arranged to turn about its polar axis, means for triggering the circuit in reponse to oscillations of the weight, and means for giving the cylinder tangentially-directed driving impulses from the circuit output, including a pulse generating coil and a magnet mounted on the periphery of the cylinder and having two arms which pass on either side of the pulse generating coil.

10. A timer including an electric circuit having an output for pulses, a clock mechanism, and means for operating the clock mechanism in response to the output from the circuit comprising an indexing coil energized from the circuit output, a stator and a movable armature located from the stator by a thin leaf spring, a torsion balance, and means for triggering the circuit in response to oscillations of the balance.

11. A timer including an electrical circuit having an output for pulses, a torsion balance comprising an elongated and vertically arranged torsion member having a rectangular cross section and wherein one side of the rectangle is much greater than the other, means suspending said torsion member from its upper end and a weight carried by the lower end thereof for effecting oscillations of said torsion member about its axis, and means for triggering said circuit in response to oscillations of said weight and including stationary electrical contacts nearer than the balance to the point of suspension and in which said elongated torsion member cooperates with said stationary contacts during each oscillation.

References Cited

UNITED STATES PATENTS

| | | | |
|---|---|---|---|
| 3,026,458 | 3/1962 | Fresystedat et al. | 318—132 |
| 3,217,191 | 11/1965 | Favre | 58—28 |
| 3,124,730 | 3/1964 | Thoma | 318—128 |

RICHARD B. WILKINSON, Primary Examiner

E. C. SIMMONS, Assistant Examiner

U.S. Cl. X.R.

58—30